US012292708B2

(12) United States Patent
Kakomura et al.

(10) Patent No.: US 12,292,708 B2
(45) Date of Patent: May 6, 2025

(54) FIXING DEVICE AND IMAGE FORMING APPARATUS

(71) Applicant: CANON KABUSHIKI KAISHA, Tokyo (JP)

(72) Inventors: Kiyoharu Kakomura, Chiba (JP); Takuya Machida, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/313,606

(22) Filed: May 8, 2023

(65) Prior Publication Data

US 2023/0384723 A1 Nov. 30, 2023

(30) Foreign Application Priority Data

May 27, 2022 (JP) ................................ 2022-086485

(51) Int. Cl.
*G03G 15/20* (2006.01)
*G03G 15/00* (2006.01)

(52) U.S. Cl.
CPC ..... *G03G 15/5029* (2013.01); *G03G 15/2039* (2013.01); *G03G 15/6541* (2013.01); *G03G 2215/00481* (2013.01); *G03G 2215/00742* (2013.01); *G03G 2215/00822* (2013.01)

(58) Field of Classification Search
CPC ........... G03G 15/5029; G03G 15/2039; G03G 15/6588; G03G 2215/00481; G03G 2215/00738; G03G 2215/00822; G03G 2215/00831; G03G 2215/00835; G03G 15/6541; G03G 2215/00126; G03G 2215/00742; G03G 2215/00936
See application file for complete search history.

(56) References Cited

U.S. PATENT DOCUMENTS

| | | | | |
|---|---|---|---|---|
| 9,239,973 | B1 * | 1/2016 | Kurihara ............ | G03G 15/6552 |
| 2010/0189450 | A1 * | 7/2010 | Hosoda .............. | G03G 15/6594 399/45 |
| 2012/0106995 | A1 * | 5/2012 | Hirano ............... | G03G 15/2039 399/45 |
| 2013/0142532 | A1 * | 6/2013 | Kitagawa ........... | G03G 15/2032 399/70 |
| 2019/0098146 | A1 * | 3/2019 | Matsushita .......... | H04N 1/0083 |
| 2023/0297012 | A1 * | 9/2023 | Endo .................. | G03G 15/2046 399/69 |

FOREIGN PATENT DOCUMENTS

| | | |
|---|---|---|
| JP | 2011242598 A | 12/2011 |

* cited by examiner

*Primary Examiner* — Arlene Heredia
*Assistant Examiner* — Laura Roth
(74) *Attorney, Agent, or Firm* — Canon U.S.A., Inc. IP Division

(57) ABSTRACT

An image forming apparatus including a fixing unit that fixes a toner image on a recording material includes an acquisition unit configured to acquire grammage information about the recording material, and a temperature control unit configured to control a temperature of a heating rotary member of the fixing unit based on the grammage information. The temperature control unit changes the temperature control of the heating rotary member depending on the acquired grammage information about a predetermined number of recording materials within a predetermined time.

4 Claims, 9 Drawing Sheets

FIG.6

| SHEET TYPE | FIXING TEMPERATURE TABLE 1 | FIXING TEMPERATURE TABLE 2 | FIXING TEMPERATURE TABLE 3 |
|---|---|---|---|
| THIN PAPER | 150 | 150 | 160 |
| PLAIN PAPER | 150 | 160 | 170 |
| THICK PAPER | 160 | 160 | 170 |
| COATED PAPER | 170 | 170 | 170 |

FIXING DEVICE AND IMAGE FORMING APPARATUS

BACKGROUND

Field

The present disclosure relates to image forming apparatuses using electrophotographic techniques, such as printers, copiers, facsimiles, and multifunction peripherals.

Description of the Related Art

An image forming apparatus includes a fixing unit that fixes an unfixed toner image on a recording material to the recording material.

It is known that the fixing unit includes a heating rotary member that includes a heating source for heating an unfixed toner image, and a pressing rotary member for pressing the heating rotary member (Japanese Patent Application Laid-Open No. 2011-242598). The fixing unit further includes a contact/separation operation mechanism that allows the pressing rotary member to shift between a position where the pressing rotary member is in contact with the heating rotary member and a position where the pressing rotary member is separated from the heating rotary member. The pressing rotary member at the position where the pressing rotary member is in contact with the heating rotary member forms a nip portion with the heating rotary member. The unfixed toner image on the recording material is fixed to the recording material through the nip portion where the conveyed recording material with the unfixed toner image on it is heated and pressed for fixing.

The amount of heat to fix a toner image formed on a recording material varies depending on the type of recording material. Japanese Patent Application Laid-Open No. 2011-242598 discusses a technique of changing the temperature of the heating rotary member based on the type of recording material. This technique controls the amount of heat given to a toner image on a recording material appropriately.

For a job that includes a plurality of types of recording material, the fixing temperature to be changed based on the type of recording material will be changed at every change in type of recording material.

This will reduce the number of sheets printed per unit time (productivity). To solve this issue, a technique is proposed of acquiring information about the types of recording material included in a job in advance, and determining the fixing temperature(s) based on the information. This technique enables the fixing temperature(s) to be appropriately set for the types of recording material included in a job. This reduces the number of times the fixing temperature is switched, thereby preventing the productivity from decreasing.

However, it can take much time to acquire information about the types of recording material included in a job in advance due to some reasons, such as much information about the recording materials to acquire. The image forming operation normally starts after the information about the recording materials is acquired, so that the image forming operation does not start until the acquisition of the information about the recording materials is completed. This can cause the image forming operation to be late, and thus, reducing its productivity.

SUMMARY

According to an aspect of the present disclosure, an image forming apparatus includes a heating rotary member configured to heat a recording material, a pressing rotary member configured to press the heating rotary member. The heating rotary member and the pressing rotary member form a nip portion through which the heating rotary member and the pressing rotary member heat and press a plurality of types of recording material having toner images thereon, and fix each toner image to a corresponding type of recording material. The image forming apparatus further includes an acquisition unit configured to acquire grammage information about the plurality of types of recording material, and a temperature control unit configured to control a temperature of the heating rotary member based on the grammage information. With the acquisition of the grammage information corresponding to a predetermined number of sheets of the plurality of types of recording material completed within a predetermined time period after a printing start signal for a job to form images on the predetermined number of sheets of the plurality of types of recording material is input, the temperature control unit controls the temperature of the heating rotary member based on the grammage information corresponding to the predetermined number of sheets of the plurality of types of recording material. With the acquisition of the grammage information corresponding to the predetermined number of sheets of the plurality of types of recording material not completed within the predetermined time period after the printing start signal for the job to form the images on the predetermined number of sheets of the plurality of types of recording material is input, the temperature control unit controls the temperature of the heating rotary member based on the grammage information corresponding to a smaller number of sheets of at least one of the plurality of types of recording material than the predetermined number of sheets of the plurality of types of recording material.

Further features of the present disclosure will become apparent from the following description of exemplary embodiments with reference to the attached drawings.

BRIEF DESCRIPTION OF THE DRAWINGS

FIG. 6 is a table for describing read-ahead control.

DESCRIPTION OF THE EMBODIMENTS

<General Configuration>

Figure 1:
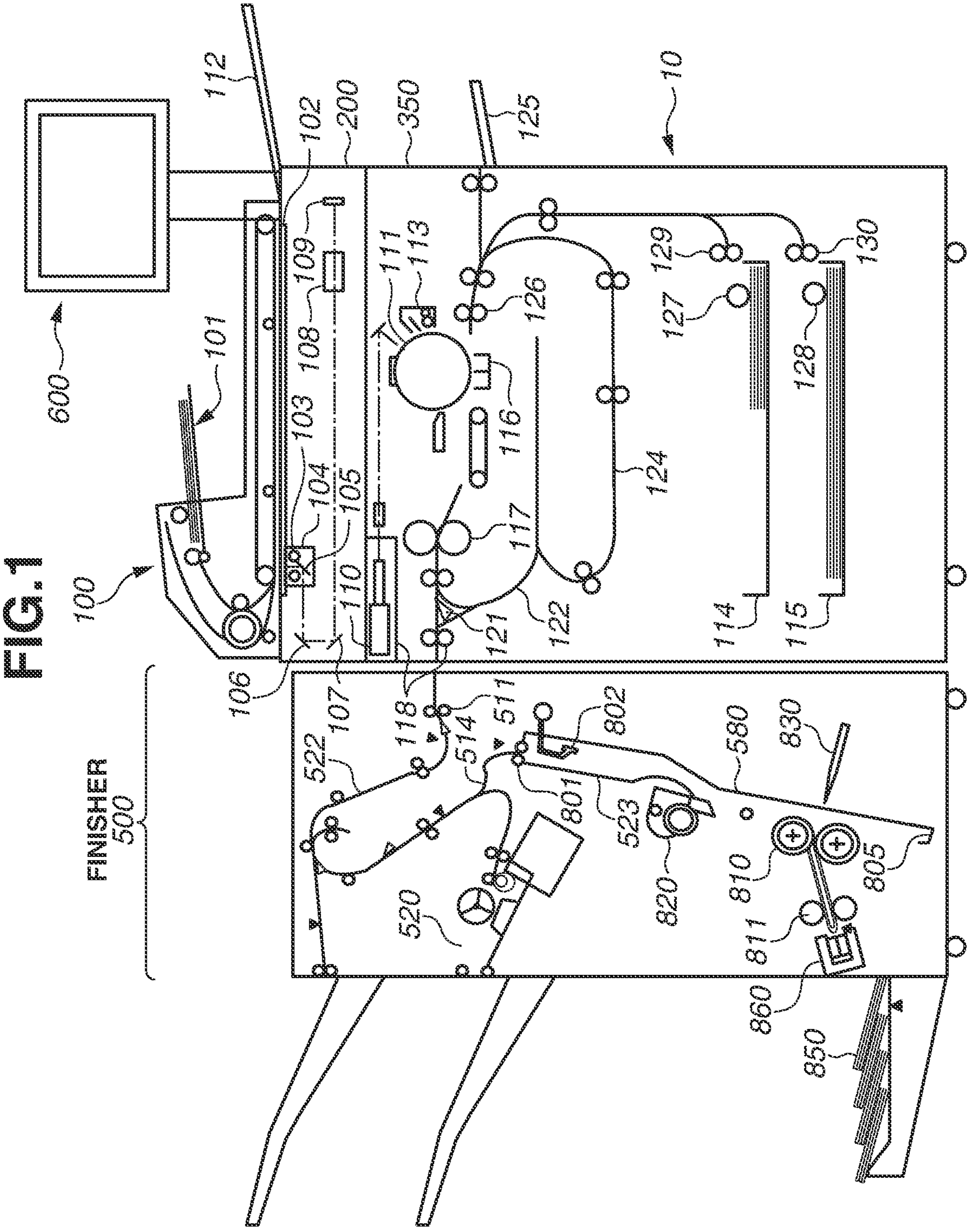
FIG. 1 illustrates a general view of an image forming system according to a first exemplary embodiment.

FIG. 1 is a configuration diagram illustrating a cross-sectional configuration of the main part of an image forming system according to a first exemplary embodiment. The image forming system consists of an image forming apparatus 10 and a finisher 500 as illustrated in FIG. 1. The image forming apparatus 10 includes an image reader 200 that reads images on originals, and a printer 350 that forms an image read by the image reader 200 on a sheet.

An original feeder 100 sequentially feeds originals set on an original tray 101 with their front sides facing upward, one by one from the leading page in the left direction as viewed in FIG. 1, such that the originals are guided along a curved path and conveyed from the left onto a platen glass 102 and then through a moving original reading position to the right. Thereafter, the originals are discharged to an external discharge tray 112. The moving original reading position is a predetermined reading position on the platen glass 102 included in the image reader 200 and at which a scanner unit 104 is fixed. As each original passes the moving original reading position on the platen glass 102 from left to right, an image of the original is read by the scanner unit 104 held in a position corresponding to the moving original reading position. As the original passes the moving original reading position, the surface of the original to be scanned is illuminated with light from a lamp 103 of the scanner unit 104, and reflected light from the original is guided into a lens 108 via mirrors 105, 106, and 107. The light that has passed through the lens 108 forms an image on the imaging surface of an image sensor 109.

Each original is thus conveyed so as to pass the moving original reading position from left to right, whereby scanning is performed to read the original with a direction orthogonal to the conveying direction of the original as the main scanning direction and the conveying direction of the original as the sub scanning direction. Specifically, as the original passes the moving original reading position, the image of the original is read line by line in the main scanning direction by the image sensor 109 while the original is being fed in the sub scanning direction, whereby the whole original image is read. The original image optically read by the image sensor 109 is converted into image data by the image sensor 109 for output. The image data output from the image sensor 109 is input as a video signal to an exposure unit 110 of the printer 350.

The exposure unit 110 of the printer 350 modulates laser light based on the video signal input from the image reader 200 and outputs the modulated laser light. The laser light is emitted on a photosensitive drum 111 while being scanned by a polygon mirror 110*a*. An electrostatic latent image is formed on the photosensitive drum 111 based on the scanned laser light. When stationary original reading is performed, the exposure unit 110 emits the laser light to form an erect image (non-mirror image). The electrostatic latent image on the photosensitive drum 111 is visualized as a developer image by a developer supplied from a developing unit 113.

Meanwhile, each sheet fed by pick-up rollers 127 and 128 from an upper cassette 114 and a lower cassette 115, respectively, in the printer 350 is conveyed up to a registration roller pair 126 by feeding roller pairs 129 and 130, respectively. After the leading edge of the sheet reaches the registration roller pair 126, the sheet is conveyed between the photosensitive drum 111 and a transfer unit 116 by the registration roller pair 126 driven at a timing in synchronization with the start of emitting the laser light. The developer image formed on the photosensitive drum 111 is transferred onto the fed sheet by the transfer unit 116. The sheet having the developer image transferred thereon is conveyed to a fixing unit 117. The fixing unit 117 fixes the toner image to the sheet by heating and pressing the sheet having the toner image thereon through a nip formed by a heating rotary member and a pressing rotary member. The fixing unit 117 includes the heating rotary member that gives, to the sheet, heat generated by the heating rotary member.

Target temperatures of the heating rotary member are set based on types of recording material and/or their grammages. A temperature control unit as described below controls the temperature of the heating rotary member so that the temperature of the heating rotary member reaches a target temperature. The sheet that has passed through the fixing unit 117 is discharged via a flapper 121 and a discharge roller pair 118 from the printer 350 toward the outside of the image forming apparatus 10 (finisher 500).

When the sheet is to be discharged with the image-formed surface thereof facing downward, i.e. face-down, the sheet having passed through the fixing unit 117 is temporarily guided into an inverting path 122 by switching operation of the flapper 121. Subsequently, after the trailing edge of the sheet has passed the flapper 121, the sheet is switched back and discharged from the printer 350 by the discharge roller pair 118. This sheet discharge mode will be hereinafter referred to as "inverted discharge". The inverted discharge is carried out when images are sequentially formed starting with the leading page, for example, when images read using the original feeder 100 are formed or when images output from a computer are formed. The sheets thus discharged by the inverted discharge are stacked in the correct page order. When a hard sheet, such as an overhead projector (OHP) sheet, is supplied from the manual paper feed tray 125, and an image is formed on this sheet, the sheet is not guided into the inverting path 122, and hence discharged by the discharge roller pair 118 with the image-formed surface thereof facing upward, i.e., face-up. Further, when a double-sided printing recording operation for forming images on both sides of a sheet is set, the sheet is guided into the inverting path 122 by switching operation of the flapper 121, and then conveyed to a duplex conveying path 124. Thereafter, the sheet guided on the duplex conveying path 124 is fed again between the photosensitive drum 111 and the transfer unit 116 at the timing described above.

The process in which a recording material fed from the upper cassette 114 or the lower cassette 115 passes through the fixing unit 117 and an image is formed on the recording material will be referred to as "image formation".

Sheets discharged from the printer 350 of the image forming apparatus 10 are sent to the finisher 500.

<Finisher>

A configuration of the finisher 500 will now be described with reference to FIG. 1.

The finisher 500 performs various types of post-processes including a process of sequentially taking in sheets discharged from the image forming apparatus 10 and aligning a plurality of sheets taken therein into a bundle, a stapling process of stapling the trailing end of the sheet bundle with a stapler, a punching process of punching holes in the trailing end of sheets taken therein, a sorting process, a non-sorting process, and a binding process.

The finisher 500 takes in a sheet discharged from the image forming apparatus by an inlet roller pair 511 and conveys the sheet to a sorting path 522.

A switching flapper 514, which is disposed downstream of the sorting path 522, is a flapper that switches between the path to a process tray and the path to a binding path 523.

The sheet guided into the binding path 523 is conveyed via a conveying roller pair 801 to a binding process tray 580. A binding inlet sensor (not illustrated) is provided at a midpoint on the binding path 523.

The binding process tray 580 includes a sheet holding member 802 and a movable sheet positioning member 805. A saddle stitching stapler 820 is further provided, which allows a stapling process to be performed on a sheet bundle received in the binding process tray 580. A folding roller pair 810 and a thrusting member 830 opposed to the folding roller pair 810 are disposed downstream of the saddle stitching stapler 820. The thrusting member 830 is caused to project toward the sheet bundle received in the binding process tray 580, whereby the sheet bundle is pushed in between the folding roller pair 810. The folding roller pair 810 folds the sheet bundle and conveys the folded sheet bundle downstream. The folded sheet bundle is conveyed via a folding conveying roller pair 811 downstream on the conveying path. Downstream of the folding conveying roller pair 811, a pressing unit 860 is provided, and the sheet bundle is conveyed up to the pressing unit 860. The pressing unit 860 applies pressure to the folded portion to securely fold the sheet bundle.

The sheet bundle folded by the pressing unit 860 is discharged onto a binding tray 850 by the folding conveying roller pair 811.

When sheets discharged from the image forming apparatus 10 are sequentially stacked on the binding process tray 580, the sheet received first is placed inside, and the sheet received last is placed outside in folding in the form of projecting around the center of the sheets described above. The sheet to be the cover is therefore to be placed outside for binding, so that the cover undergoes the image formation lastly and then is stacked on the binding process tray 580.

(General System Block Diagram)

Figure 2:
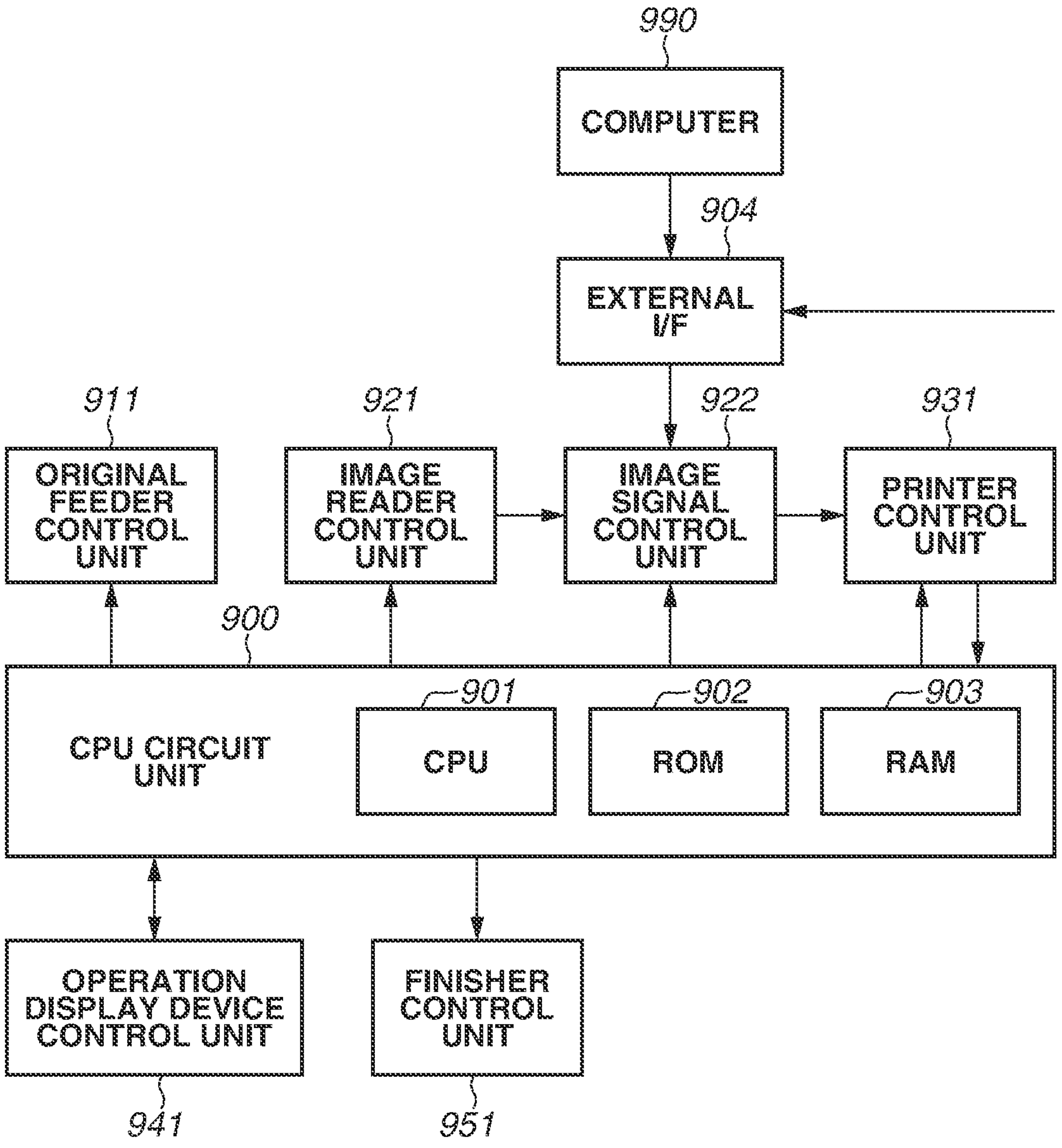
FIG. 2 is a general system block diagram of the image forming system.

The configuration of a controller that controls the overall operation of the image forming system and a general block diagram of the image forming system will now be described with reference to FIG. 2. FIG. 2 is a block diagram illustrating the configuration of the controller that controls the overall operation of the image forming system of FIG. 1.

The controller includes a central processing unit (CPU) circuit unit 900 as illustrated in FIG. 2. The CPU circuit unit 900 includes a CPU 901, a read-only memory (ROM) 902, and a random-access memory (RAM) 903. The CPU 901 is a CPU that controls the general basic operations of the image forming system. The ROM 902 with control programs stored therein and the RAM 903 for performing processing are connected to each other through an address bus and a data bus. The CPU 901 integrally controls the respective control units 911, 921, 904, 922, 931, 941, and 951 using the control programs stored in the ROM 902. The RAM 903 temporally stores control data, and is used as a work area for calculation in control operations.

The original feeder control unit 911 performs the drive control of the original feeder 100 under instructions from the CPU circuit unit 900. The image reader control unit 921 performs drive controls of units, such as the scanner unit 104 and the image sensor 109 described above, and transfers image signals output from the image sensor 109 to an image signal control unit 922.

The image signal control unit 922 converts the analog image signals from the image sensor 109 into digital signals, performs various types of pieces of processing on the digital signals, converts the digital signals into video signals, and outputs the video signals to a printer control unit 931. On the other hand, digital image signals input from a computer 990 via an external interface (I/F) 904 undergoes various types of pieces of processing, and are converted into video signals, and are output to the printer control unit 931. The pieces of processing performed by the image signal control unit 922 are controlled by the CPU circuit unit 900. The printer control unit 931 controls the exposure unit 110 and the printer 350 based on the input video signals, to perform image formation and sheet conveyance operations.

A finisher control unit 951, which is included in the finisher 500, performs the general drive controls of the finisher 500 through communication of information with the CPU circuit unit 900.

An operation display device control unit 941 controls the communication of information between an operation display device 600 and the CPU circuit unit 900. The operation display device 600 includes a plurality of keys for setting various types of function related to image formation, and a display unit for displaying information indicating settings. The operation display device 600 outputs key signals each corresponding to operation of one of the plurality of keys to the CPU circuit unit 900, and displays corresponding information based on each key signal from the CPU circuit unit 900.

(Method for Inputting Jobs for Binding Process)

Figure 3:
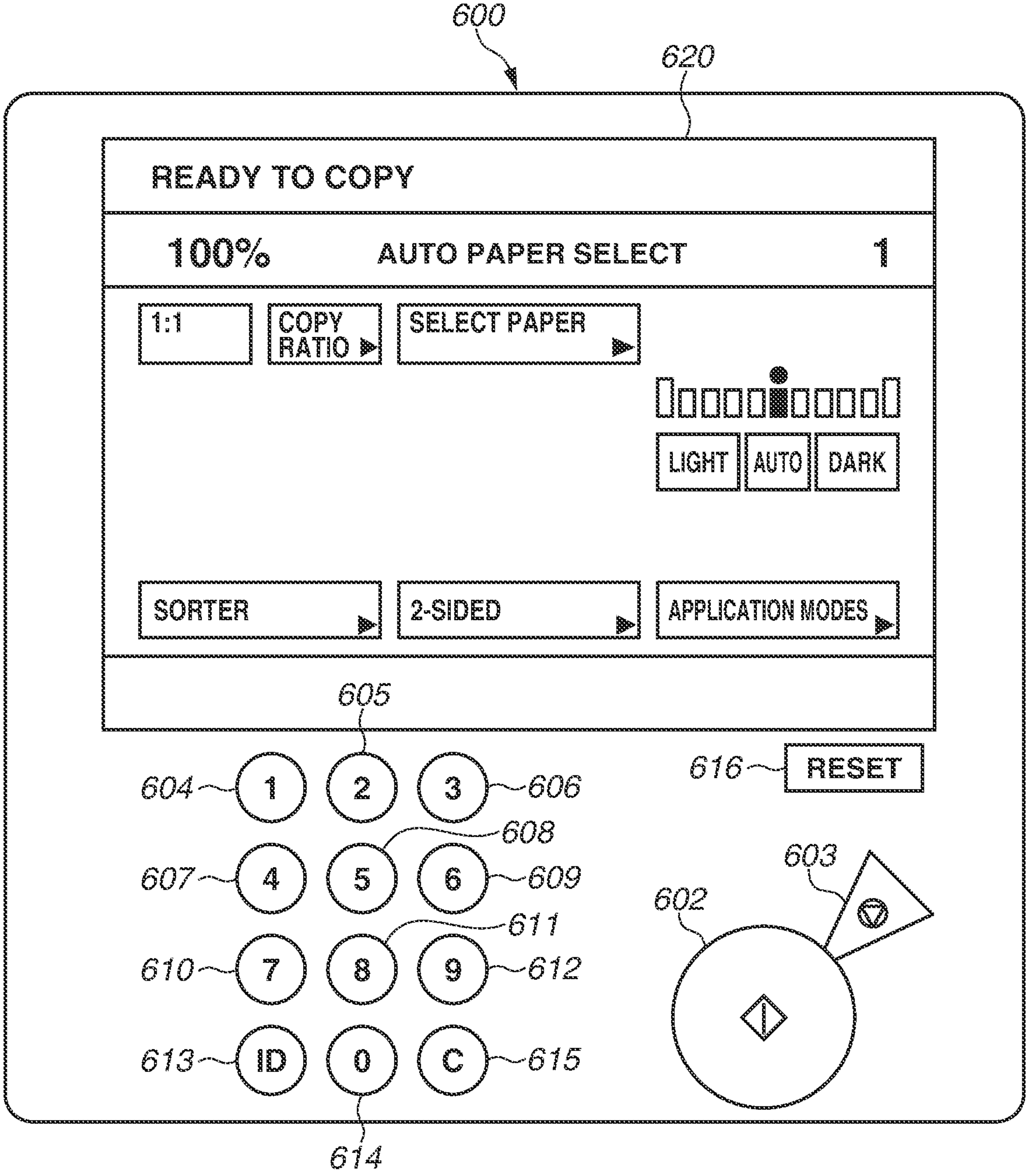
FIG. 3 is a descriptive view of an operation unit of the image forming system.

The operation display device 600 on the image forming system will now be described with reference to FIG. 3. The operation display device 600 includes a touch panel 620, a key pad including number keys 604 to 612, and 614, an identification (ID) key 613, and a clear key 615, a reset button 616, a start button 602, and a stop button 603.

The touch panel 620 consists of a liquid crystal display (LCD) screen and a detection unit configured to acquire the XY coordinates of a portion a user pushes down. The number keys 604 to 612, and 614 are used to input numerical values, such as the number of copies and a copy ratio for a job. The ID key 613 is used to input management numbers for users that use the image forming system. The clear key 615 is used to clear values input from the number keys 604 to 612, and 614.

The reset button 616 is used to change the settings for a job input from the touch panel 620 back to the initial values. The start button 602 is used to start a job based on the settings input from the touch panel 620. The stop button 603 is used to stop a job started using the start button 602.

A method for specifying sheets to be used when a binding process is to be performed by the image forming system will now be described with reference to FIGS. 4A to 4E.

Figure 4A:
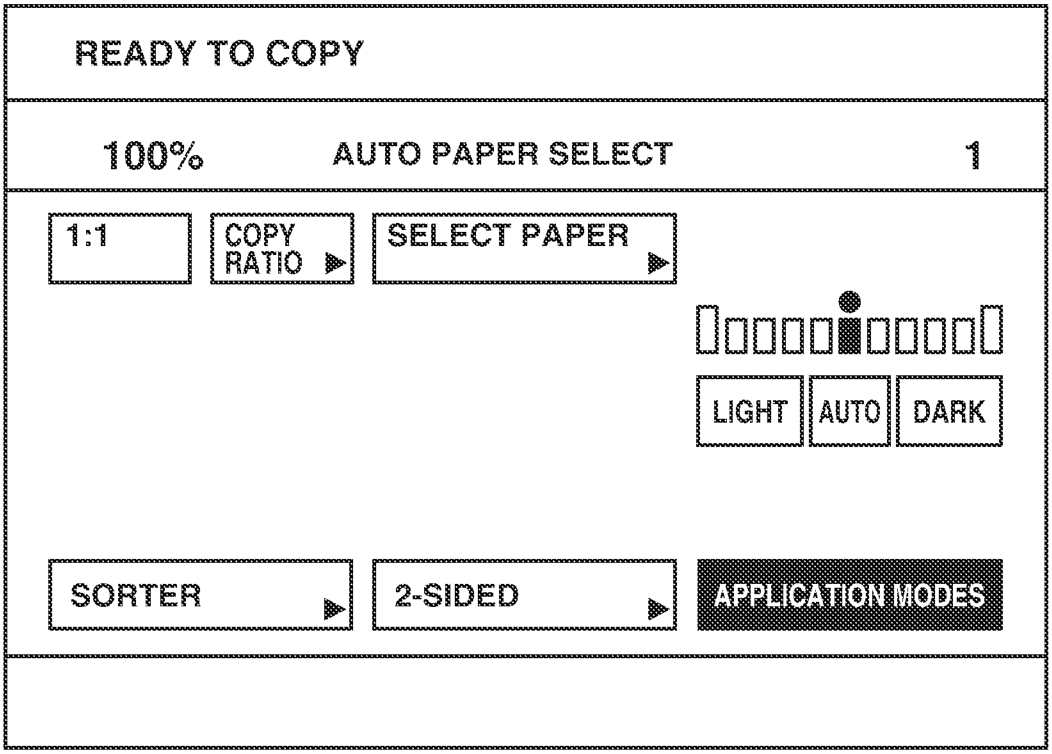
FIGS. 4A to 4E are descriptive views of binding process settings.

FIG. 4A illustrates an initial screen to run a copy job with the image reader 200 when a binding process is to be performed in the image forming system. This screen allows setting as to whether a user uses application modes including a binding process. When the user presses the application modes button on the touch panel 620, the LCD screen transitions to the screen in FIG. 4B.

Figure 4B:
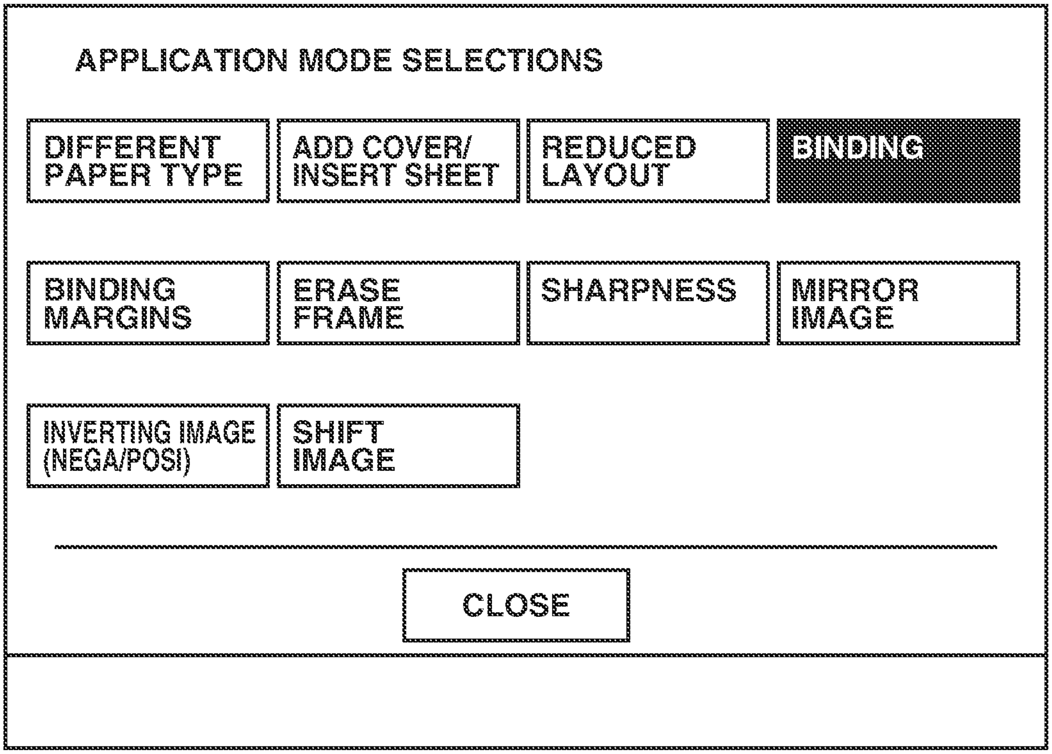

FIG. 4B is a detail settings screen of the application modes of FIG. 4A, and the detail settings screen allows selection of an application mode function to make settings for a job, including handling different types of sheets, binding, and/or other functions. A plurality of application modes can be set. When the user presses the “Binding” button on the touch panel 620 here, the LCD screen transitions to the screen in FIG. 4C. If the user presses the “Close” button, the LCD screen returns to the screen in FIG. 4A.

Figure 4C:
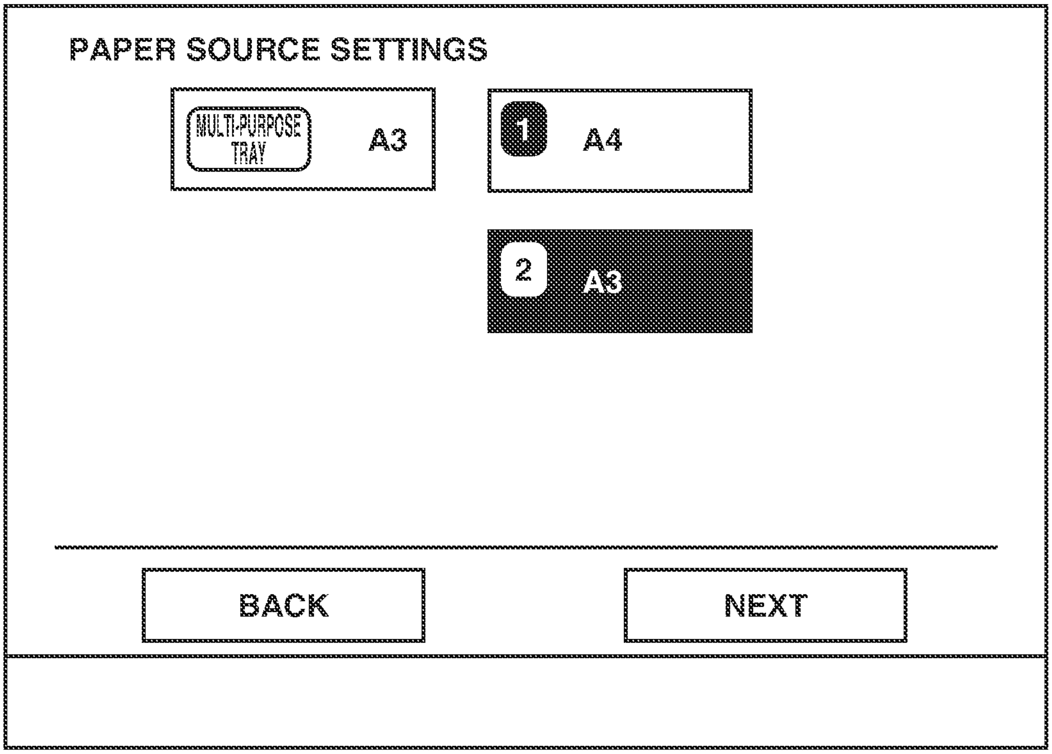

The screen in FIG. 4C is a detail settings screen that allows selection as to which paper source is used for the cover sheet used in the binding process, and the user can select Paper Source 1, Paper Source 2, or Multi-Purpose Tray. When the user presses the “Next” button here, the LCD screen transitions to the screen in FIG. 4D.

Figure 4D:
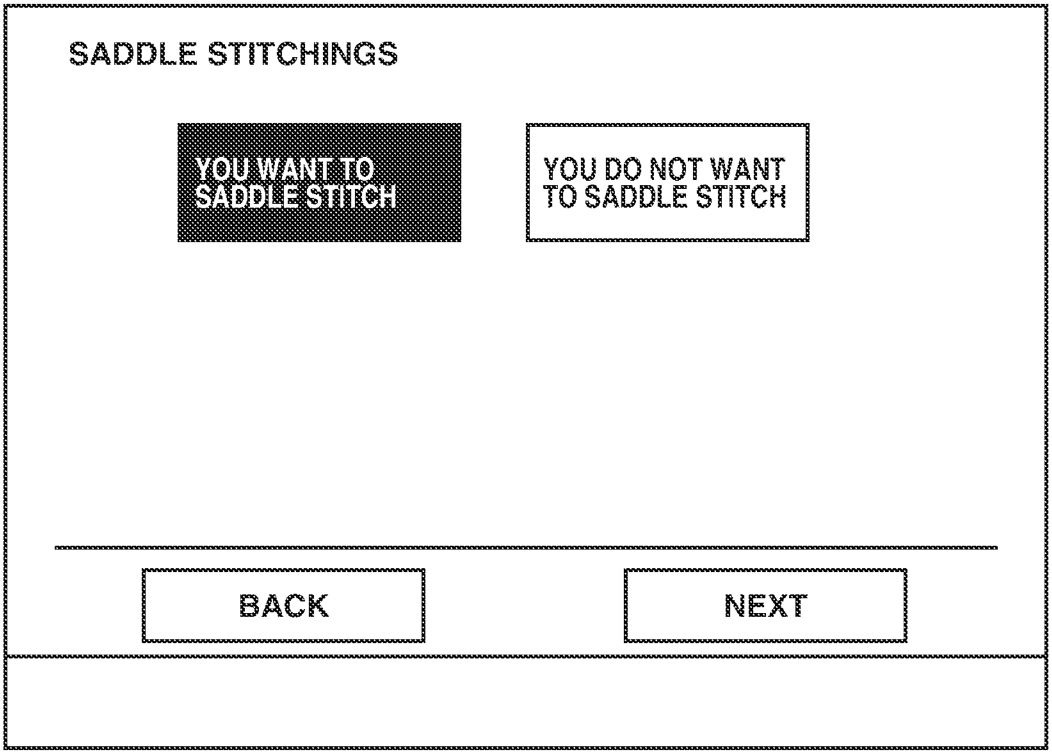

The screen in FIG. 4D is a detail settings screen that allows setting as to whether to perform stapling in saddle stitching in the finisher 500 in the binding process. If the user selects the “You want to saddle stitch” button here, a process is specified that performs stapling around the center of a set of sheets and then folding the sheets. If the user selects the “You do not want to saddle stitch” button, a process is specified that performs folding a set of sheets without stapling the sheets. When the user presses the "Next" button on the touch panel 620 here, the LCD screen transitions to the screen in FIG. 4E.

Figure 4E:
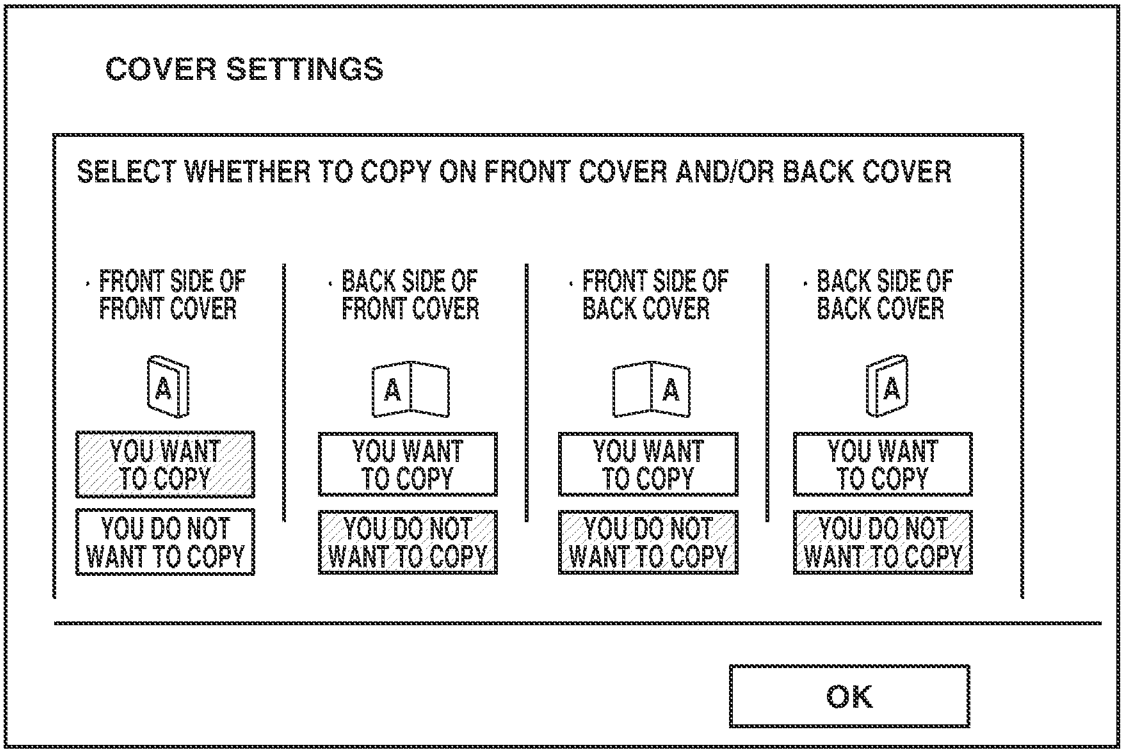

The screen in FIG. 4E is a detail settings screen that specifies as to whether to form a copy image on each side of the cover sheet in the binding process. The screen in FIG. 4E allows setting as to whether to form a copy image on each of the four respective sides: "the front side of the front cover", "the back side of the front cover", "the front side of the back cover", and "the back side of the back cover". When the user presses the "OK" button here, the settings specified here are set for the job, and the LCD screen returns to the screen in FIG. 4B.

The setting method described above allows setting for feeding a cover sheet from a paper source different from a paper source for the text, setting as to whether to perform saddle stitching, and setting as to whether to form a copy image on each side of the cover in the binding process.

Although the example described above is given of setting a job on the touch panel 620, the exemplary embodiments are not limited to the example. A job may be set on the screen of a computer that is used to send print jobs to the image forming apparatus 10.

<Image Layout in Binding Process>

A page layout method for the pages of original images when the left-opening book is discharged to the binding tray 850 after a binding process that includes adding a cover sheet to a left-opening book is performed will now be described with reference to FIG. 5A to 5C.

Figures 5A, 5B, 5C:
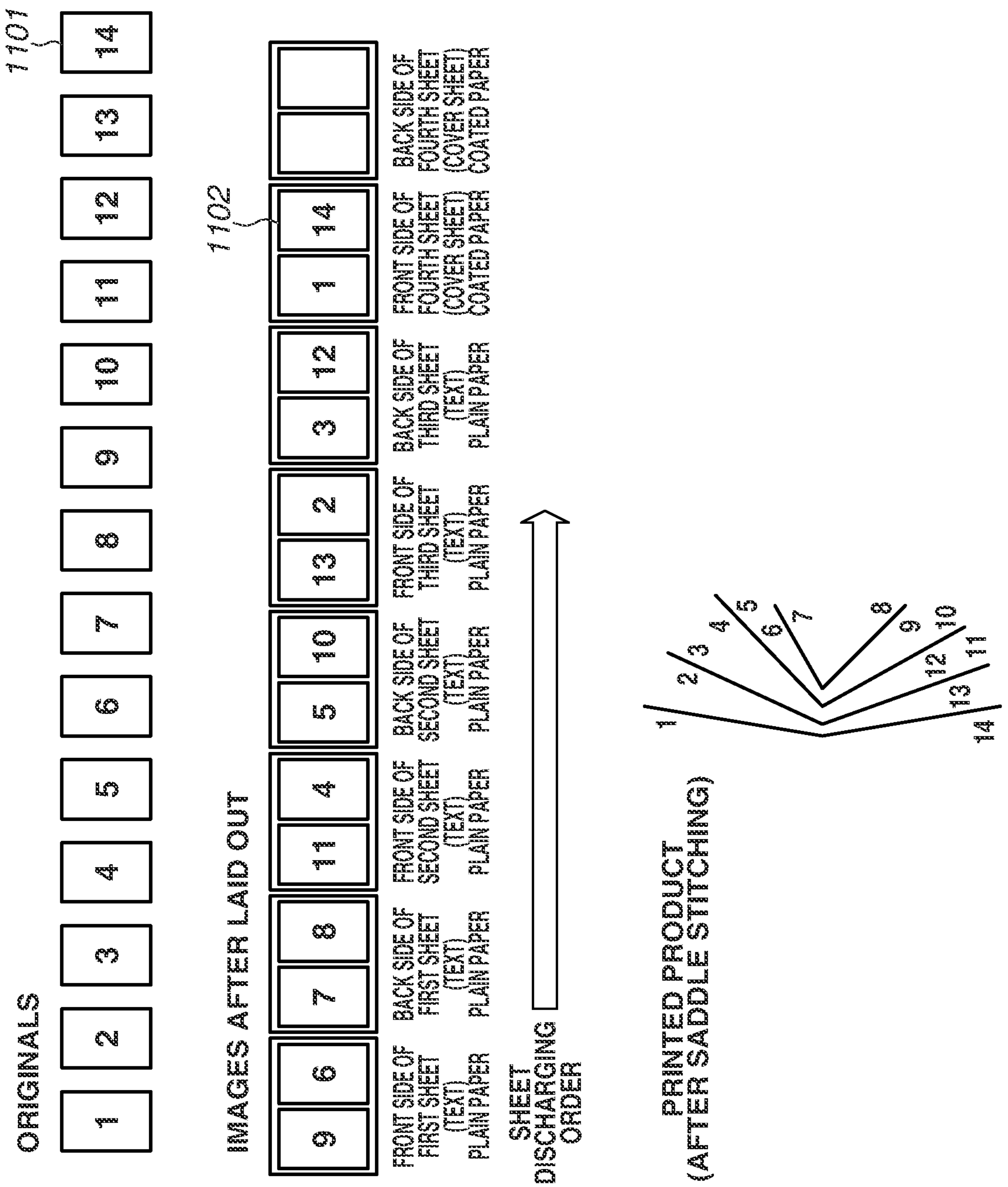
FIGS. 5A to 5C are diagrams illustrating a method for laying out images in the binding process.

When the left-opening book is discharged to the binding process tray 580, images on the pages 1101 in FIG. 5A are laid out in a layout 1102 as illustrated in FIG. 5B, and are stored in the image signal control unit 922. After the images are laid out, printing is performed in the order of the images of the text of the book and then the images of the sheet corresponding to the cover of the book. For the layout of the images after the images are laid out, illustrated in FIG. 5B, the printer control unit 931 performs printing in the order of the front side (text) of the first sheet, the back side (text) of the first sheet, the front side (text) of the second sheet, the back side (text) of the second sheet, the front side (text) of the third sheet, and the back side (text) of the third sheet. Lastly, the printer control unit 931 performs printing of the front side (front cover) of the fourth sheet and the back side (back cover) of the fourth sheet. Subsequently, the printed sheets are transferred to the finisher 500, and stacked in order in the binding process tray 580. The printed sheets undergo a saddle stitching binding process and then a folding process, and are discharged to the binding tray 850.

<Productivity Priority Mode and Image Quality Priority Mode>

The image forming apparatus 10 according to the present exemplary embodiment includes a productivity priority mode that gives priority to productivity, and an image quality priority mode that gives priority to image quality. In these modes, the image forming apparatus 10 performs image formation.

A mode to be used in image formation is selectable on the touch panel 620 of the operation display device 600. A mode may be selected on the external I/F 904.

With a job including a plurality of recording materials different in grammage or type of recording material from one another in the job, changing the target temperature at the fixing unit 117 depending on the grammage leads to lower productivity. To prevent the productivity from getting lower, the productivity priority mode performs fixing on a recording material having a different grammage at a fixing temperature guaranteeing the fixability. This reduces the number of times the fixing temperature is changed, preventing the productivity from getting lower.

On the other hand, the image quality mode is a mode that gives priority to the image quality of a formed image.

The image quality mode therefore changes the temperature more finely depending on the grammage than the productivity priority mode does. The image quality of a toner image formed on a recording material depends on the amount of heat given to the toner image. An optimum temperature is determined depending on the grammage of a recording material. The image quality is thus enhanced by the heat at the optimum temperature being given to the toner image. The image quality priority mode includes temperatures set finely for grammages and types (coated or non-coated sheet) of recording materials. In the image quality priority mode, the fixing temperature is more frequently changed in a mixed job in which different grammages are mixed than in the productivity priority mode. A change of the fixing temperature entails a time period of changing the fixing temperature, which tends to reduce the productivity. The image quality of printed images in a mixed job therefore tends to be higher in the image quality priority mode than in the productivity mode. On the other hand, the productivity in printing in the image quality priority mode tends to be lower than in printing in the productivity priority mode.

<Information about Recording Materials is Acquired in Advance Before Image Formation is Started>

Acquiring information about recording materials in advance before image formation is started will now be described. The following is a description of the control of receiving information about recording materials as much as possible before the image formation is started and selecting an optimum fixing temperature table based on the received information about the recording materials.

First, printing details are input on the external I/F 904 or the operation display device control unit 941. After the printing details are input, when the user presses the start button 602, a printing start signal is input into the CPU 901. The printing job is started to run. After the printing job is started to run, the input printing details are transferred to the CPU 901 in the image forming apparatus 10. The printing details include the grammages and types of the recording materials. The CPU 901 includes an acquisition unit configured to acquire this information, and can grasp the information about the grammages of the recording materials in the printing job. The printing job information is acquired in the printing order.

A method for selecting a fixing temperature table when the CPU 901 receives information corresponding to a predetermined number of sheets (15 sheets in the present exemplary embodiment) will be described using fixing temperature tables in FIG. 6.

Although the predetermined number of sheets is 15 here, the predetermined number is not limited to this number. Any number is selectable depending on the engine configuration or other conditions.

The CPU 901 includes a temperature control unit configured to control the target temperature of the heating rotary member in the fixing unit 117. The temperature control unit sets an optimum temperature of the heating rotary member from the grammage information about the predetermined number of sheets of recording materials subject to printing, the information being acquired by the acquisition unit. As described below, setting "an optimum temperature" means setting a fixing temperature table to take the shortest time period to switch temperatures.

FIG. 6 illustrates three types of temperature tables. Each table includes temperatures to be set for respective types of sheets. For example, with Fixing Temperature Table 1, the temperature control unit performs a temperature setting so that the fixing unit is controlled at 150° C. when a recording material is thin paper.

A method will be described of selecting a fixing temperature table, for example, for a mixed printing job with the leading ten sheets of plain paper and the following five sheets of coated paper in a more concrete manner.

The CPU 901 determines that the recording materials in the job in the information acquired in advance consist of plain paper and coated paper, for example. The information subject to determination by the CPU 901 may be grammages. Next, the CPU 901 calculates temperature changes between plain paper and coated paper for the respective fixing temperature tables, and selects a fixing temperature table with the least temperature change. Specifically, with Fixing Temperature Table 1 of FIG. 6, the temperature for plain paper is 150° C., and the temperature for coated paper is 170° C., so that the temperature change is 20° C. Similarly, with Fixing Temperature Table 2, the temperature for plain paper is 160° C., and the temperature for coated paper is 170° C., so that the temperature change is 10° C. Similarly, with Fixing Temperature Table 3, the temperature for plain paper is 170° C., and the temperature for coated paper is 170° C., so that there is no temperature change. The CPU 901 hence selects Fixing Temperature Table 3.

For simplified description of the present exemplary embodiment, the method has been described of selecting a fixing temperature table not taking into account the order of pieces of sheet information the acquisition unit acquires before a printing job is started to run (the order of plain paper and then coated paper in this case) and the numbers of sheets of recording materials (ten sheets of plain paper and five sheets of coated paper in this case). A method may be used of selecting a fixing temperature table considering the order and/or the numbers of sheets in received information.

<Description of Procedure of Determining Predetermined Time Period>

The example has been given of acquiring information about recording materials before the printing job is started to run, and based on the information, reducing a target temperature change of the heating rotary member in the fixing unit 117 during the image formation operation. On the other hand, the time period from pressing the start button 602 to starting the image formation is set short to enhance productivity (the number of sheets printed per unit time). If it takes much time to acquire information about recording materials, for example, due to much information about the recording materials, the image formation operation is not started before the acquisition of the information about the recording materials is completed. This results in much time taken until the first recording material through the image formation operation is discharged, which can reduce the productivity.

The following is a description in a case of much information about recording materials in a concrete manner. To prepare image formation information per page in reading images, control processing is performed of converting control information for printing data written in a page description language into bitmap information, i.e., Raster Image Processor (RIP) processing. The time period of the RIP processing depends on the amount of data written in a page description language, and varies with the number of times vector image information included in a page is converted into bitmap information, the complexity of the conversions, and the amount of objects about which their pieces of bitmap data in different forms and resolutions are converted based on the printer engine. A long time period of the RIP processing can reduce the productivity.

According to the present exemplary embodiment, although information about recording materials is to be acquired before the printing job is started to run, a time limit is applied to the time period of acquiring the information about the recording materials. This allows printing without reducing the productivity significantly.

There is also a conceivable method of setting predetermined time periods of acquiring information about recording materials to a fixed value equally, regardless of the job type. In the present exemplary embodiment, the predetermined time period however differs in job type from one another. Setting the predetermined time periods to a fixed value can prevent an optimum fixing temperature table from being selected due to lack of information about recording materials acquired before the image formation start. This can occur in the case of a book produced through a saddle stitching or adhesion process. This is because the cover is printed lastly in reverse order of page processing due to the post-process operation as described above. A type of paper, particularly for the cover of a book, such as coated paper, is frequently different from the type of paper used for the text to enhance the appearance of the book, which is likely to result in a mixed job with mixed different types of paper. The acquisition of information about recording materials is performed in printing order. In this case, the predetermined time period is reached before information about a large grammage sheet or a coated sheet is acquired. This causes the CPU 901 to control the temperature of the heating rotary member in the fixing unit 117 not taking into account the information about these types of recording materials. This results in an increased frequency of temperature changes or a greater temperature change of the heating rotary member in the fixing unit 117, reducing the productivity. If a job includes a large grammage sheet and/or a coated sheet to be printed in the latter half in printing order, it is suitable that the predetermined time period is prolonged, in some cases.

Figure 7:
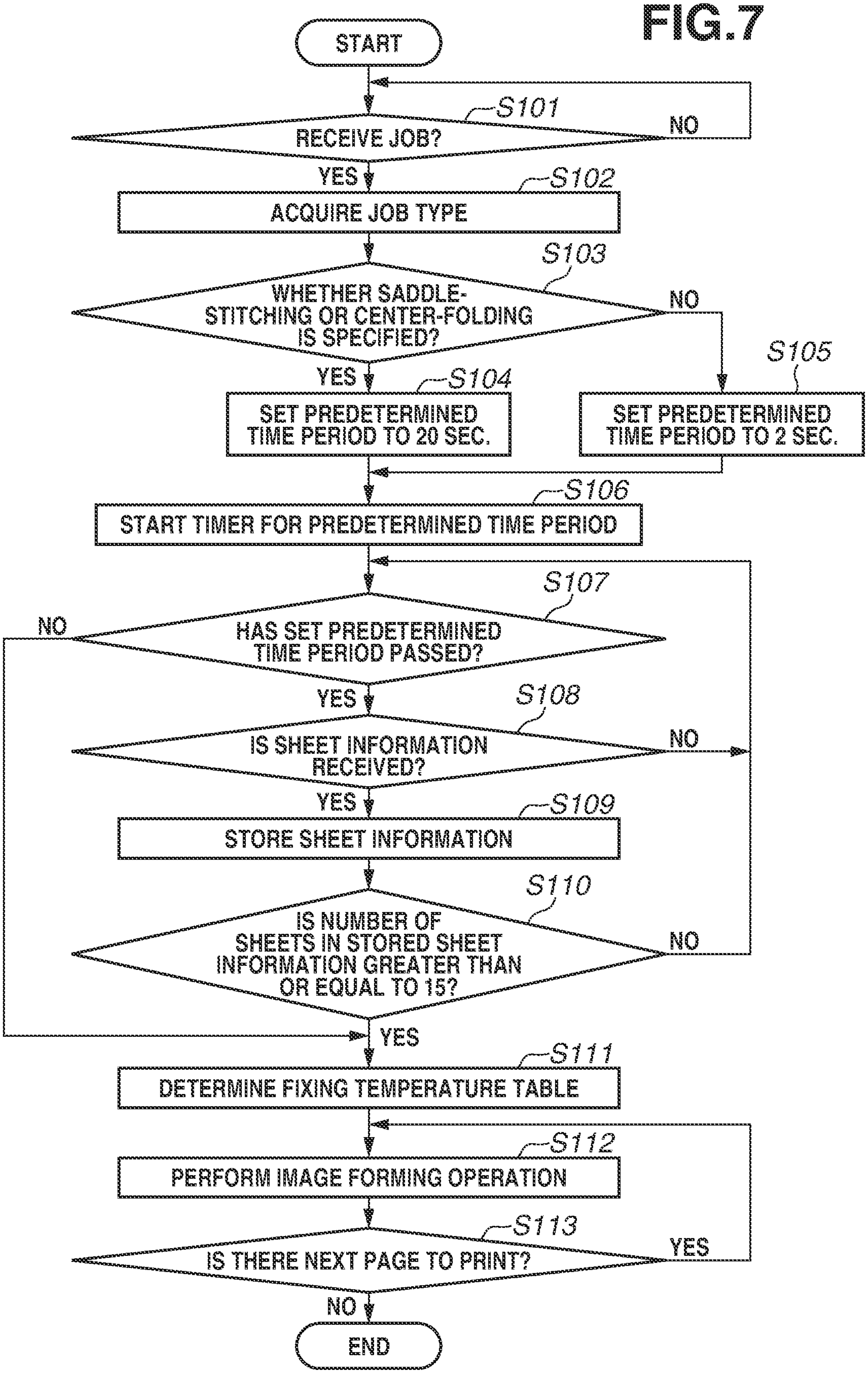
FIG. 7 is a flowchart according to the first exemplary embodiment.

A procedure of determining the predetermined time period will now be described with reference to FIG. 7. In step S101, the CPU 901 waits for the start button 602 to be pressed (No in step S101). If the start key is pressed, the job is started to run (Yes in step S101). In step S102, the CPU 901 acquires the type of the job to be used in image forming operation. In step S103, the CPU 901 determines whether saddle stitching or center folding is specified in the post process based on the type of the job acquired in step S102.

If saddle stitching or center folding is specified (Yes in step S103), the processing proceeds to step S104. In step S104, the CPU 901 sets the predetermined time period to 20 seconds. If saddle stitching or center folding is not specified (No in step S103), the processing proceeds to step S105. In step S105, the CPU 901 sets the predetermined time period to two seconds. In the present exemplary embodiment, the maximum number of sheets subject to saddle stitching or center folding in the finisher 500 is 25. Even when cover information is lastly received in reverse order of pages, the set time period of 20 seconds is sufficient. In the other cases, in which the page order is the forward order, if the information corresponding to at least two pages is present, the information about the sheets for the cover and the text can be acquired, so that the set time period is two seconds. In this manner, a predetermined time period can be determined based on the engine configuration.

In step S106, the CPU 901 starts a timer for measuring the predetermined time period.

In step S107, the CPU 901 determines whether the timer has measured the predetermined time period determined in step S104 or S105. If the timer has not measured the predetermined time period (Yes in step S107), the processing proceeds to step S108. If the timer has measured the predetermined time period (No in step S107), the processing proceeds to step S111. In step S108, the CPU 901 determines whether information about the recording materials is received. If the information about the recording materials is not received (No in step S108), the processing returns to step S107. If the information about the recording materials is received (Yes in step S108), the processing proceeds to step S109. In step S109, the CPU 901 stores the information about the recording materials in the RAM 903. In step S110, if the number of sheets in the stored recording material information is greater than or equal to 15 (Yes in step S110), the processing proceeds to step S111. If the number of sheets in the stored recording material information is smaller than 15 (No in step S110), the processing returns to step S107. The acquired information about the recording materials is updated based on the printing order at every returning to step S107.

In step S111, a fixing temperature table with the least temperature change is selected from among the fixing temperature tables illustrated in FIG. 6 based on the information about the recording materials stored in step S109. In step S111 when the processing proceeds from step S107, i.e., if the number of sheets in the recording material information acquired by the CPU 901 is smaller than the predetermined number of sheets, a fixing temperature table is determined based on the stored recording material information by the time the predetermined time period elapses. In step S111 when the processing proceeds from step S110, i.e., if the number of sheets in the recording material information acquired by the CPU 901 is the predetermined number, a fixing temperature table is determined based on the stored recording material information corresponding to 15 sheets.

In step S112, the CPU 901 performs an image forming operation at a fixing temperature or fixing temperatures for the sheets calculated from the fixing temperature table determined in step S111. In step S113, if there is the next page to print (Yes in step S113), the processing returns to step S112. Otherwise (No in step S113), the job is ended.

Although the predetermined number of sheets is 15 without variation, the number of sheets is changeable depending on the engine configuration.

Further, the predetermined number of sheets is changeable depending on the type of job. In the present exemplary embodiment, the example has been given of saddle-stitch binding. A job with pages to be handled in reverse order similarly to a job with saddle-stitch binding (for example, case binding to produce a book through an adhesion process) may be dealt with in a similar manner.

For example, in the case of a job with ten sheets of plain paper and five sheets of coated paper as described above, if information about 15 sheets of recording materials as a predetermined number of sheets is acquired within a predetermined time period, Fixing Temperature Table 3, which will lead to the least temperature change, is set as the target temperature(s). Now, suppose information about a predetermined number of sheets of recording materials has not been acquired within a predetermined time period. If information about eight sheets of recording materials is acquired within a predetermined time period, the CPU 901 sets a fixing temperature table based on the information about the recording materials as the first to eighth plain paper sheets. Set values of the fixing temperature table of the image forming apparatus 10 is the set values of Fixing Temperature Table 2 set as the default settings. Fixing Temperature Table 2 is thus set, and an image formation operation is started. As a result, setting a predetermined time period can cause the fixing temperature(s) to be different between the case where the acquisition of information about a predetermined number of sheets of recording materials is successful and the case where the acquisition of information about a predetermined number of sheets of recording materials is not successful.

On the other hand, in the case of a printing job with eight sheets of plain paper and seven sheets of coated paper, if information about 15 sheets of the recording materials as a predetermined number of sheets is acquired within a predetermined time period, Fixing Temperature Table 3, which will lead to the least temperature change, is set as target temperatures. Now, suppose information about eight sheets alone which includes all the types of recording material in the job is acquired. In this case, the set fixing temperature table is identical between the case where the acquisition of information about a predetermined number of sheets of recording materials is successful and the case where the acquisition of information about a predetermined number of sheets of recording materials is not successful, preventing the productivity from decreasing due to temperature change.

Conventionally, if it takes much time to acquire information about recording materials after the printing job is started to run, the image forming operation is started late in some cases. According to the present exemplary embodiment, a predetermined time period is provided to a time period of acquiring information about recording materials after a printing job is started to run. This forces the image forming operation to be started when the predetermined time period elapses. As a result, the time period until the first sheet of a recording material through the image formation operation is discharged becomes shorter.

For simplified description of the present exemplary embodiment, an image formation operation is started after a fixing temperature table is determined. Preparatory operations (for example, the rotation of the photosensitive drum and making settings of various types of high voltage sequence) to start an image formation operation may be performed in parallel with the acquisition of information about recording materials. This can shorten a time period until a recording material through the image formation operation is discharged after an image formation operation is started.

In the present exemplary embodiment, the example has been given of determining a predetermined time period based on the job type when a job is received. However, the timing of determining a predetermined time period is not limited to when a job is received. A predetermined time period may be determined based on the sheet information when information about recording materials is acquired. The start of measuring a predetermined time period is also not limited similarly. In the present exemplary embodiment, although measuring a predetermined time period is started after the start button 602 is pressed or after a predetermined time period is set, the measurement may be started when the CPU 901 receives a printing job.

As described above, a predetermined time period provided in a case of acquiring information about recording materials before the image formation operation start can prevent the productivity of printing from decreasing even if the image preparation takes much time.

Further, a prolonged predetermined time period depending on the type of a job allows the period until the book is completed to be shorter.

In the present exemplary embodiment, although the timeout depends on the content of a job, any timeout may be set on a screen provided in an operation unit or set in a printer driver.

Other than different types of recording materials for the cover and the text for binding, extending the timeout for users that frequently use different recording materials for the text for binding and, on the contrary, shortening the timeout for users that use one type of recording material alone can shorten the substantial wait time until a print job is completed, enhancing the productivity more for the users.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-086485, filed May 27, 2022, which is hereby incorporated by reference herein in its entirety.

What is claimed is:

1. An image forming apparatus comprising:

a heating rotary member configured to heat a recording material;

a pressing rotary member configured to press the heating rotary member, and to form a nip portion with the heating rotary member, and to fix a toner image on the recording material with the heating rotary member;

an acquisition unit configured to acquire grammage information about the recording material; and a temperature control unit configured to control a temperature of the heating rotary member based on the grammage information, wherein the temperature control unit controls the temperature of the heating rotary member based on the grammage information corresponding to a predetermined number of sheets of recording materials, when the acquisition unit completes the acquisition of grammage information the grammage information corresponding to the predetermined number of sheets of recording materials within a predetermined time period after a printing start signal for a job to form the images on the predetermined number of sheets of recording materials is input, and wherein the temperature control unit controls the temperature of the heating rotary member based on the grammage information corresponding to a smaller number of sheets of recording materials than the predetermined number of sheets of recording materials without waiting for completion of the acquisition of the grammage information corresponding to the predetermined number of sheets of recording materials, when the acquisition unit has not completed the acquisition of the grammage information corresponding to the predetermined number of sheets of recording materials within the predetermined time period after the printing start signal is input.

2. The image forming apparatus according to claim 1, further comprising a finisher configured to perform a binding operation, wherein the predetermined time period when the binding operation is to be performed is a first predetermined time period and the predetermined time period when the binding operation is not to be performed is a second predetermined time period longer than the first predetermined time period.

3. The image forming apparatus according to claim 1, wherein the image forming apparatus is able to change the predetermined time period to any predetermined time period.

4. The image forming apparatus according to claim 1, wherein the predetermined time period is shorter than a time period until a first recording material of the job is caused to be conveyed after the printing start signal for the job to form the images on the predetermined number of sheets of recording materials is input.

* * * * *